United States Patent
Cyrot

(10) Patent No.: US 10,065,728 B2
(45) Date of Patent: Sep. 4, 2018

(54) HORIZONTAL STABILIZER TRIM ACTUATOR FAILURE DETECTION SYSTEM AND METHOD USING POSITION SENSORS

(75) Inventor: Luc P. Cyrot, Mission Viejo, CA (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 551 days.

(21) Appl. No.: 13/540,422

(22) Filed: Jul. 2, 2012

(65) Prior Publication Data

US 2013/0001357 A1    Jan. 3, 2013

Related U.S. Application Data

(60) Provisional application No. 61/503,288, filed on Jun. 30, 2011.

(51) Int. Cl.
*B64C 5/10* (2006.01)
*B64C 13/28* (2006.01)
*B64C 13/42* (2006.01)

(52) U.S. Cl.
CPC .............. *B64C 13/28* (2013.01); *B64C 13/42* (2013.01)

(58) Field of Classification Search
CPC ........... B64C 5/10; B64C 13/28; B64C 13/42; B64C 9/02; B64C 13/24; Y02T 50/44
USPC .............................. 244/99.2, 99.3, 99.4, 99.9
See application file for complete search history.

(56) References Cited

U.S. PATENT DOCUMENTS

| | | | |
|---|---|---|---|
| 3,421,719 A * | 1/1969 | Ask | 244/99.3 |
| 3,995,800 A * | 12/1976 | Swogger | 244/78.2 |
| 4,256,277 A | 3/1981 | Embree | |
| 4,841,209 A | 6/1989 | Poumakis | |
| 5,719,566 A | 2/1998 | Readman et al. | |
| 6,739,550 B2 | 5/2004 | Koizumi et al. | |
| 7,299,703 B2 | 11/2007 | Balasu et al. | |
| 7,366,590 B2 * | 4/2008 | Balasu | 701/3 |
| 7,410,132 B1 | 8/2008 | Flatt | |
| 7,556,224 B2 * | 7/2009 | Johnson | B64C 13/50 244/175 |
| 7,680,565 B2 * | 3/2010 | Balasu et al. | 701/3 |
| 7,789,345 B2 | 9/2010 | Matsui et al. | |

(Continued)

OTHER PUBLICATIONS

Edward Balaban et al.; Airborne Electro-Mechanical Actuator Test Stand for Development of Prognostic Health Management Systems; Annual Conference of the Prognostics and Health Management Society, 2010.

(Continued)

*Primary Examiner* — Medhat Badawi
(74) *Attorney, Agent, or Firm* — Renner, Otto, Boisselle & Sklar, LLP

(57) ABSTRACT

An actuator assembly having a primary load path for tightly coupling an actuated surface to a reference structure and a secondary load path having a backlash portion for coupling the actuated surface to the reference structure with backlash, wherein the secondary load path is unloaded during an operative state of the primary load path and loaded during a failure state of the primary load path. The actuator assembly includes at least one sensor configured to sense the failure state of the primary load path when a relative displacement between a portion of the primary load path and a portion of the secondary load path exceeds a predetermined value or is within a predetermined range of values.

15 Claims, 15 Drawing Sheets

(56) References Cited

U.S. PATENT DOCUMENTS

| | | | |
|---|---|---|---|
| 7,866,602 B2 | 1/2011 | Port-Robach et al. | |
| 7,946,529 B2 | 3/2011 | Moalic et al. | |
| 7,930,949 B2 | 4/2011 | Singh | |
| 8,656,797 B2* | 2/2014 | Bassett | 74/89.23 |
| 2007/0051847 A1* | 3/2007 | Quitmeyer | F16H 25/205 |
| | | | 244/99.2 |
| 2007/0108342 A1* | 5/2007 | Hanlon et al. | 244/99.2 |
| 2007/0220998 A1* | 9/2007 | Kopecek | B64C 13/28 |
| | | | 74/89.39 |
| 2008/0203223 A1* | 8/2008 | Cyrot et al. | 244/99.3 |
| 2010/0116929 A1* | 5/2010 | Hejda | B64C 13/42 |
| | | | 244/99.4 |
| 2010/0125380 A1 | 5/2010 | Brückner et al. | |
| 2010/0250047 A1* | 9/2010 | Balasu et al. | 701/29 |
| 2010/0264263 A1 | 10/2010 | Shaheen et al. | |
| 2011/0048147 A1* | 3/2011 | Keech et al. | 74/89.26 |
| 2011/0068221 A1 | 3/2011 | Recksiek et al. | |
| 2011/0000287 A1 | 6/2011 | Bacic | |
| 2012/0018578 A1* | 1/2012 | Polcuch | H02P 8/40 |
| | | | 244/99.2 |
| 2012/0025014 A1* | 2/2012 | Duyck | B64C 13/08 |
| | | | 244/99.3 |
| 2013/0105623 A1* | 5/2013 | Moulon | B64C 13/28 |
| | | | 244/99.4 |
| 2013/0116863 A1* | 5/2013 | Goupil | G01M 17/00 |
| | | | 701/14 |

OTHER PUBLICATIONS

Stephen C. Jensen et al.; Flight Test Experience With an Electro-mechanical Actuator on the F-18 Systems Research Aircraft; Presented at the 19$^{th}$ Digital Avionics Systems Conference, Oct. 7-13, 2000, Philadelphia, Pennsylvania. G. Jenney and B. Raymond, Dynamic Controls, Inc., Dayton, Ohio; D. Dawson, Wright Laboratory, WPAFB, Ohio.

Edward Balaban et al.; Experimental Validation of a Prognostic Health Management System for Electro-Mechanical Actuators; American Institute of Aeronautics and Astronautics.

Nils Wachendorf et al.; Multivariable Controller Design for a Trimmable Horizontal Stabilizer Actuator With Two Primary Load Paths; 26$^{th}$ International Congress of the Aeronautical Sciences.

* cited by examiner

HORIZONTAL STABILIZER TRIM ACTUATOR FAILURE DETECTION SYSTEM AND METHOD USING POSITION SENSORS

RELATED APPLICATIONS

This application claims the benefit of U.S. Provisional Application No. 61/503,288 filed Jun. 30, 2011, which is hereby incorporated herein by reference.

FIELD OF INVENTION

The present invention relates generally to determining mechanical failures in actuators having a primary and a secondary load path, and more particularly to detecting failures in the primary load path of actuators for aircraft stabilizers.

BACKGROUND

Modern aircraft have horizontal stabilizers located at the tail section of the fuselage or the rudder section that are pivotally supported relative to the airplane fuselage to "trim" the aircraft during flight by selective adjustment by the operator or pilot from an internal control unit. This involves adjusting the position of the horizontal stabilizer by a stabilizer actuator to accommodate different load distributions within the aircraft and different atmospheric conditions, i.e. wind, rain, snow, etc. In this regard the stabilizer is traditionally pivotally connected to the tail section of the fuselage at a point generally midway along its length. One common trimmable horizontal stabilizer actuator consists of a primary ball nut assembly connected with an actuating drive gimbal which is pivotally connected to one end of the horizontal stabilizer structure. The ball nut assembly includes a ball nut housing and a rotatable ballscrew extending axially and usually vertically through the ball nut housing and a drive gimbal housing. The ball nut housing is connected to the drive gimbal housing by a trunnion segment. The ballscrew, in turn, may have its upper end remote from the actuating drive gimbal and may be fixed from translation or axial movement by a connection to a second, support gimbal which is pivotally secured to the tail section. As the ballscrew is rotated, the drive gimbal will be moved in translation relative to it. Thus, as the ballscrew is rotated in one direction, the leading edge of the horizontal stabilizer is pivoted upward, whereas by rotating the ballscrew in the other direction, the leading edge of the horizontal stabilizer is pivoted downward. Rotation of the ballscrew is routinely done by a motor and associated gearing which is connected to the second, fixed support gimbal and which is actuated by the operator or pilot by the internal control unit. The connection of the stabilizer actuator to the stabilizer is often located within the fuselage tail section and not directly in the air stream.

The horizontal stabilizer movement, as controlled by the operator, is transmitted by the ballscrew through the actuating drive gimbal by way of the primary ball nut assembly which defines a primary load path. The movement has a load with tensile and compressive components as well as a torque component due to the ballscrew thread lead. Failures of the primary load path such as caused by the shearing off of the connecting trunnion segment or by the loss of nut ball members from the ball nut assembly can result in the complete loss of control of the horizontal stabilizer. However, stabilizer actuators have always been provided with a secondary load path as a protection against the catastrophic failure of the primary path (ball screw or its attachment points).

For safety, the structural failure of any member of the primary structural load path should be annunciated within a single flight and preclude a subsequent dispatch of the aircraft.

SUMMARY OF INVENTION

The secondary load path may be unloaded through a suitable mechanical clearance with the primary path. In case of a primary load path failure, the load is transferred to the secondary load path only after a relative motion between the two paths. Monitoring this relative motion between the two paths with an electronic sensor (particularly a position sensor) is a practical way of detecting the primary load path failure. This motion is approximately equal to the built-in mechanical clearance and may be measured by a position sensor, particularly by one or more linear variable differential transducers (LVDTs).

Significant simplification of the design, lower weight, smaller size and a cost reduction over a mechanical method of failure detection, as well as simplification of reset by ground crews is possible with embodiments described herein. Further, embodiments described herein take advantage of unidirectional load in some targeted applications.

According to one aspect of the invention, an actuator assembly includes a primary load path for tightly coupling an actuated surface to a reference structure; a secondary load path having a backlash portion for coupling the actuated surface to the reference structure with backlash, wherein the secondary load path is unloaded during an operative state of the primary load path and loaded during a failure state of the primary load path; and a first sensor configured to sense the failure state of the primary load path when a relative displacement between a portion of the primary load path and a portion of the secondary load path exceeds a predetermined value.

In an embodiment, the sensor is a position sensor

In another embodiment, the sensor is a linear variable differential transducer.

In yet another embodiment, the first sensor is configured to detect a failure state in one of an upper or lower primary attachment system.

In a further embodiment, the first sensor is configured to detect a failure state in at least one of a main housing, gimbal, primary attachment pins, or the ballscrew of the primary load path.

In a still further embodiment, the first sensor is configured to detect a failure state in at least one of a primary nut gimbal housing, primary ball nut assembly, or trunnion.

In another embodiment, the actuator assembly further includes a second sensor configured to detect a failure state in the other one of an upper or lower primary attachment system.

In another embodiment, the actuator assembly further includes a locking mechanism for engaging the secondary load path including manually resettable locking keys engageable under a tension load.

In another embodiment, the locking mechanism for engaging the secondary load path further includes manually resettable locking key retainers triggerable under a tension load.

According to another aspect of the invention, a method for handling failure of a primary load path of an actuator includes receiving sensor signals from one or more sensors;

determining a relative displacement between a portion of the primary load path and a portion of a secondary load path based on the received signals; comparing the relative displacement to a predetermined range of values; and annunciating a failure of the primary load path if the relative displacement is within the predetermined range of values.

In an embodiment, the predetermined range of values is a range centered around a value determined by a summation of the amount of structural deformation in the primary load path during an operative state and an amount of backlash required for triggering a locking key to engage the secondary load path.

In another embodiment, annunciating the failure includes locking the actuator.

In yet another embodiment, the method further includes notifying an automatic control unit of the failure so that the actuator remains locked if the automatic control unit initiates control of a system including the actuator after the actuator has been locked.

In a further embodiment, the one or more sensors include one set of upper load path sensors or lower load path sensors to monitor respective upper or lower system components.

In a still further embodiment, the method further includes excluding a signal from an individual sensor in the set of sensors when the signal from the individual sensor indicates a relative displacement greater than the predetermined range of values.

In another embodiment, the method further includes locking the actuator when signals from two or more individual sensors of the set of sensors indicate a relative displacement greater than the predetermined range of values.

In another embodiment, the one or more sensors include the other set of upper load path sensors or lower load path sensors.

The foregoing and other features of the invention are hereinafter described in greater detail with reference to the accompanying drawings.

DETAILED DESCRIPTION

The sensors described herein can be continuous (as may be required by certification authorities) and can convey signals to the pilot and/or a flight log indicating the detection (or non-detection) of drive-path failure. They may be any appropriate sensor such as an electrical switch, a mechanical position sensor (such as a linear variable differential transducer), Hall-effect sensor, linear encoder, or the like, or even a combination thereof. For the sake of brevity, one particular embodiment is described herein, so the sensors will be referred to, herein, as linear variable differential transducers (LVDT). However, it will be understood that any appropriate sensor could be used, instead.

The motion provider for the actuator described herein need not be an electric motor and/or the assembly 40 need not include rotational members such as the ballscrew and the ball nut. The motion provider could instead comprise hydraulic and/or pneumatic cylinders, or any other device which can transfer linear movement to the actuated surface. That being said, relatively rotational members, and especially those incorporating balls or rollers, often offer higher stiffness, lighter weight, lower cost, and/or greater packaging flexibility, and therefore, for the sake of brevity, the description will hereafter use the example of an electromechanical ballscrew/ball nut actuator being used as a horizontal stabilizer trim actuator (HSTA) in an aircraft. However, it is understood that the invention works equally well with any actuator having a primary and a secondary load path. The primary and secondary load paths may be concentric and, to some extend coextensive with one another in the single actuator.

Figure 1:
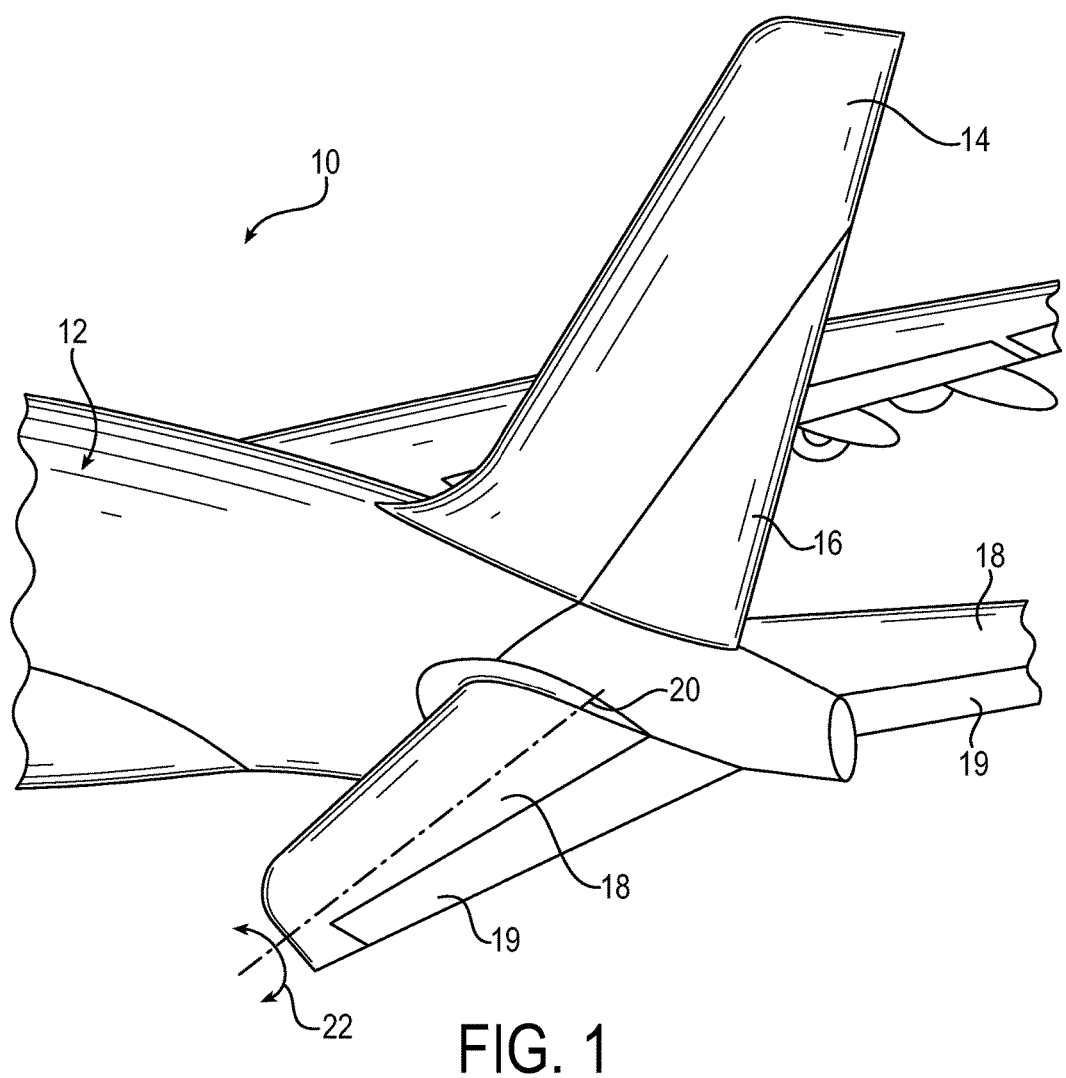
FIG. 1 is a simplified perspective view of the rear fuselage of an aircraft and the horizontal stabilizers pivotally mounted thereon.
Figure 2:
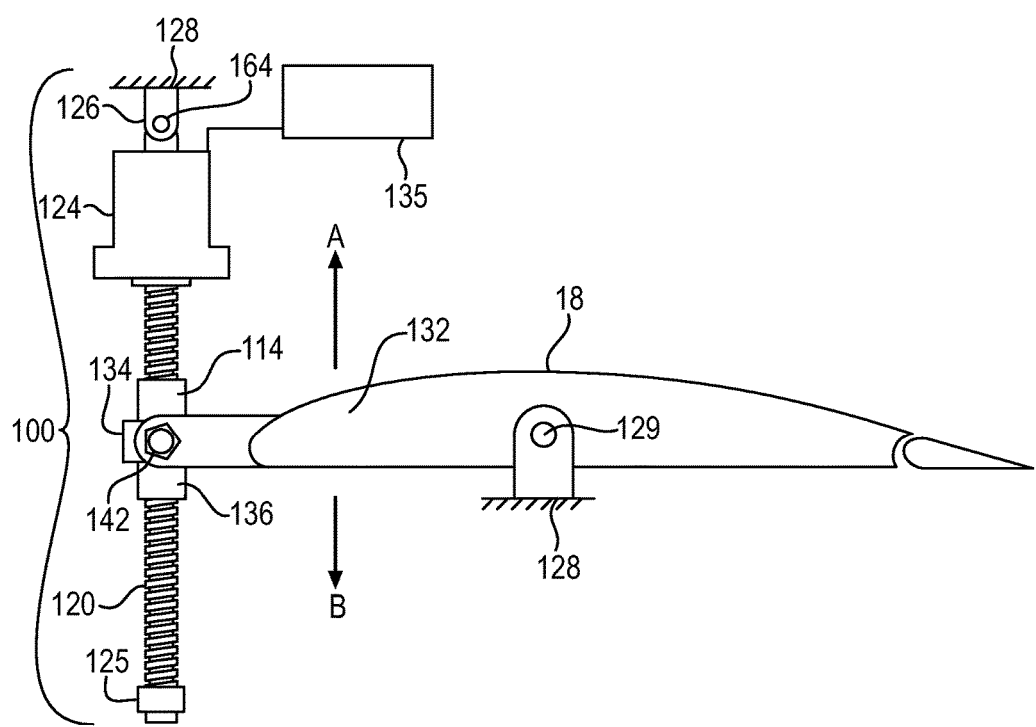
FIG. 2 is a schematic drawing generally depicting the assembly of the stabilizer actuator and the stabilizer relative to an aircraft rudder section or tail section of the fuselage.

Referring first to FIG. 1, an aircraft 10 can comprise a rear fuselage 12 having a tail fin 14 which carries the rudder 16 and horizontal stabilizers 18 and elevators 19 on either side thereof. Each horizontal stabilizer 18 is pivotally mounted to the fuselage at pivot point 20 whereby it can be pivoted about axis 22 to adjust the longitudinal pitch of (i.e., "trim") the aircraft 10. During flight, the horizontal stabilizer is adjusted by an actuator which moves its leading edge upward/downward relative to the axis 22. The stabilizer adjustments may be automatically controlled directly from the aircraft's flight computers (for example, an automatic flight control unit, or any automatic control unit in other applications) and/or may be manually controlled by pilot input.

Looking now to FIGS. 2-13, a stabilizer actuator 100 is shown for selectively controlling the position of a horizontal stabilizer (or a control surface, more generally) 18. The actuator 100 includes a primary load path section generally indicated by the numeral 114 having a primary ball nut assembly 116. The primary ball nut assembly 116 includes a ball nut housing 118 connected by threads with a ballscrew 120 via a plurality of nut ball members (not shown for clarity). The ballscrew 120 may extend generally vertically and may be connected at its upper end to a hydraulic or electric drive motor and gear assembly 124. An end cap 125 may be fixed to the opposite lower end of the ball screw 120 to assure that the ballscrew 120 will not be unthreaded from the primary ball-nut assembly 116. The drive motor and gear assembly 124 is connected to an upper support gimbal 126 which in turn is pivotally secured at a fixed position to a portion of the rudder section or tail section 128 (more generally, a reference structure) of the fuselage. The drive motor and gear assembly 124 and the details thereof are of a construction well known in the art and thus it is only generally shown and described for purposes of simplicity and brevity.

The horizontal stabilizer 18 may be pivotally connected along its length by a pivot structure 129 which is fixed to the rudder section or fuselage tail section 128. The forward end 132 of the horizontal stabilizer 18 may be in turn pivotally connected to an actuating drive gimbal 134 located generally midway along the ballscrew 120 and which in turn is pivotally connected to the primary ball nut assembly 116 which is secured to the drive gimbal 134. The details of connection of stabilizer actuators to the rudder section or fuselage tail section have been omitted for purposes of brevity and simplicity.

In order to selectively set the position of the horizontal stabilizer 112, the pilot through operation of an internal control unit 135 will energize the drive motor and gear assembly 124 to rotate the ballscrew 120 in one direction which will move the primary ball nut assembly 116 and drive gimbal 134 upward along the axially fixed ballscrew 120 to pivot the forward end 132 of the stabilizer 18 upward or to rotate the ballscrew 120 in the opposite direction which will move the primary ball nut assembly 116 and drive gimbal 134 downward along the fixed ballscrew 120 to pivot the forward end 132 downward. As this occurs the stabilizer actuator 100 may pivot at the fixed support gimbal 126 and pivot at the movable drive gimbal 134 to accommodate the angular, arcuate displacement of the forward end 132 of the stabilizer 18. Apparatuses such as an internal control unit 135 are generally well known in the art and thus known details thereof have been omitted for purposes of brevity and simplicity, except where discussed further below.

As will be seen, upon failure of the primary load path section 114 the secondary load path section 136 may be actuated to lock the stabilizer 18 in a fixed position or to control the stabilizer 18.

Looking now to FIGS. 3-10, the primary load path section 114 includes the primary ball nut assembly 116 which has the ball nut housing 118 with helically extending threads on its inner surface. A plurality of nut ball members is matingly located in the housing grooves. The ballscrew 120 extends through the nut housing 118 and in turn has helically extending threads on its outer surface which are also adapted to matingly receive the nut ball members. As noted such basic structures, which are used to transfer loads by relative rotation with reduced friction, are well known in the art and hence the specific details thereof have been omitted for purposes of simplicity and brevity.

Thus, as noted, as the ballscrew 120 is rotated, the primary ball nut assembly 16, which is fixed from rotation, along with the primary gimbal housing 142 will be moved axially in translation along the ballscrew 120 to thereby pivot the horizontal stabilizer 18 about its pivot structure 129. This structure of the primary load section 114 then provides the primary load path for actuation of the horizontal stabilizer 18 as controlled by the operator.

A secondary load path is provided by the secondary load path section 136. The secondary load path section 136 includes a secondary housing assembly 140.

The secondary load path is unloaded through a suitable mechanical clearance with the primary path while the primary path is in an operative state (in other words, not in a failure state). In case of a primary load path failure, the load is transferred to the secondary load path only after a relative motion between the two paths. Monitoring this relative motion between the two paths with a sensor (particularly a position sensor) is a practical way of detecting the primary path failure. This motion is equal to the built-in mechanical clearance and may be measured by one or more LVDTs 150 as seen in FIG. 3, for example.

During normal HSTA operation, LVDT 150 displacement is minimal, equivalent to a sum of backlash and elastic deformation of the structural load path members under load. When any member of a primary load path fails, the displacement exceeds a predetermined value and the failure is detected. This predetermined value may not be equal to the full mechanical clearance, and may include a predetermined range of values. Partial structural failure may only result in abnormal structural deflections and limited relative motion between paths. The use of position sensors enables the detection of such partial failures that prior-art systems are not capable of.

In one proposed embodiment, four LVDTS 150 (two per electrical channel) may be used as shown in the figures. The two LDVTs on the left in FIG. 3 and shown again in FIGS. 11 and 13 will detect any structural failure in the lower primary attachment system components including, for example, the main housing 160, gimbal 126, primary attachment pins 164, and the ballscrew 120. The load is transferred to a tie rod 165 inside the ballscrew 120 and independently attached to the aircraft structure with controlled clearance.

Figure 3:
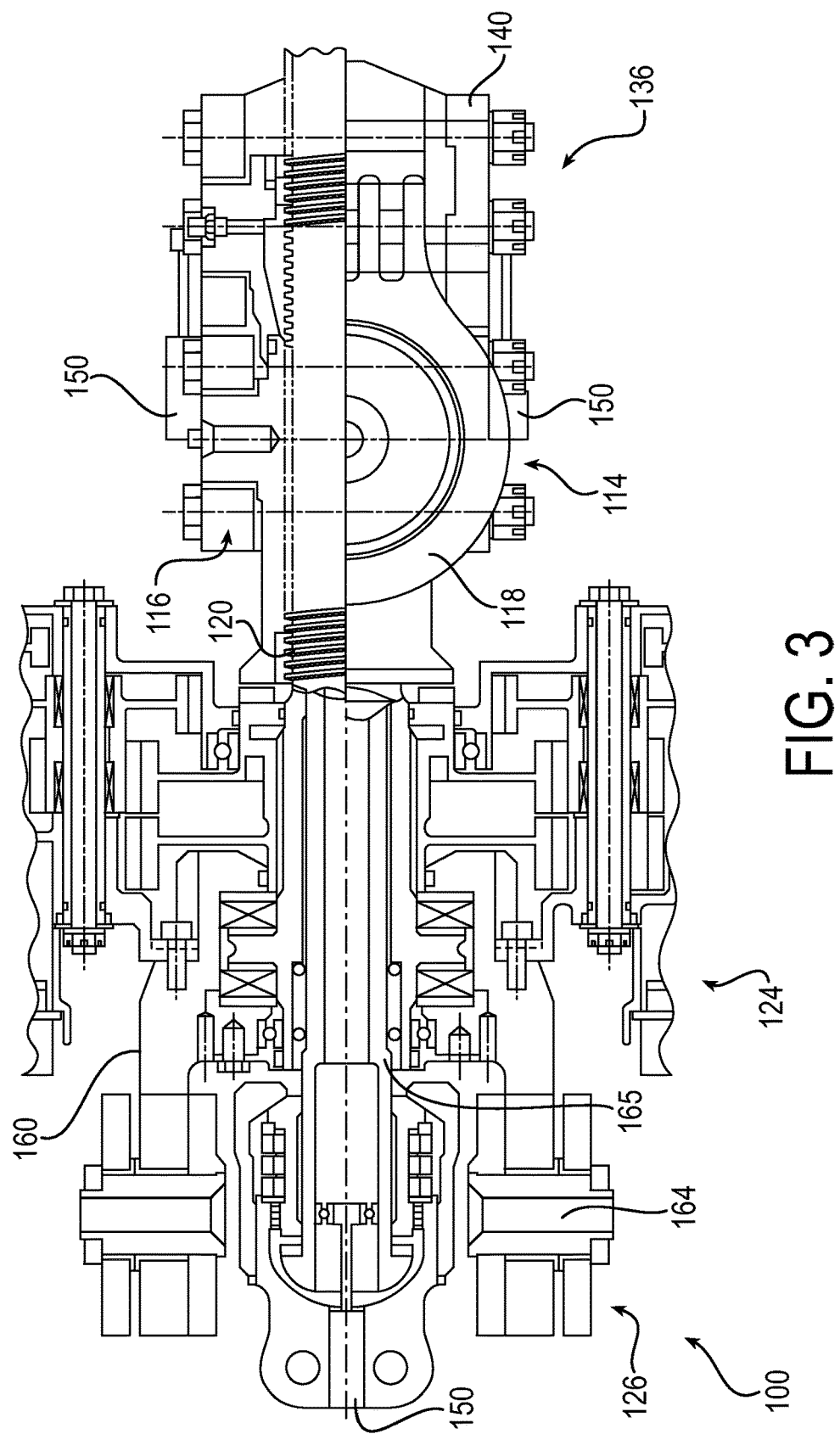
FIG. 3 is a schematic, partial sectional view generally depicting the assembly of the stabilizer actuator.
Figure 4:
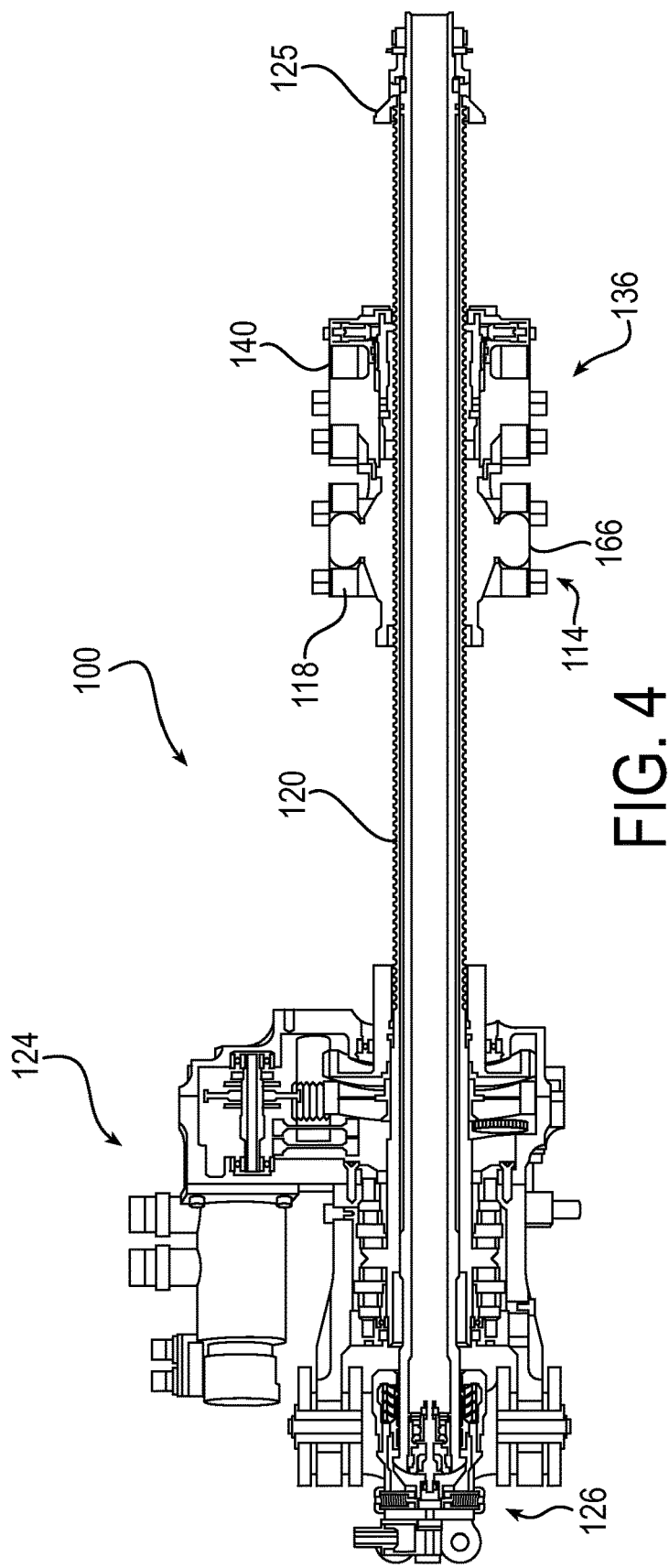
FIG. 4 is a cross-sectional view generally depicting the assembly of the stabilizer actuator.
Figure 5:
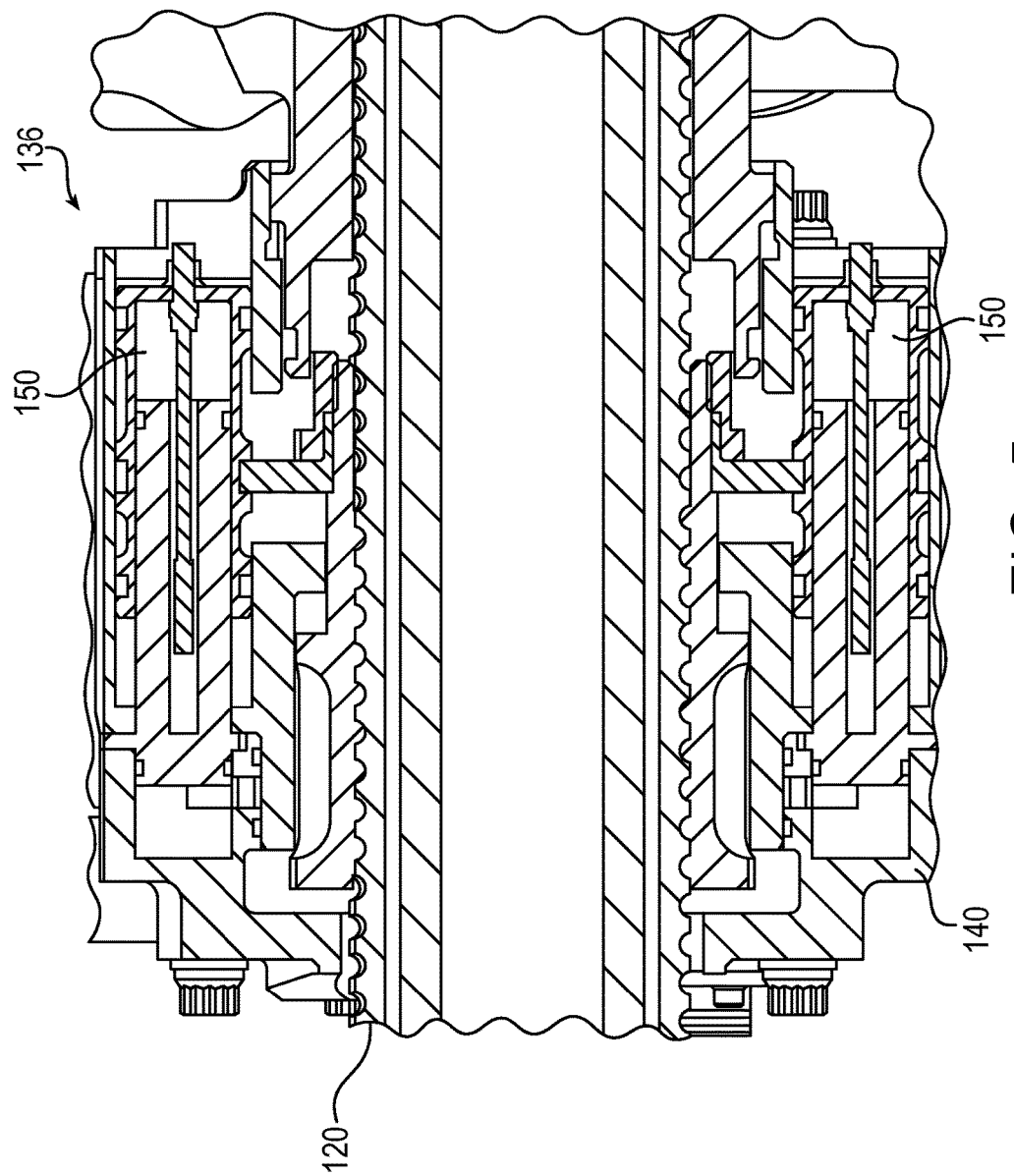
FIG. 5 is a cross-sectional view depicting the upper attachment assembly of the stabilizer actuator with LVDTs driven by a secondary ball nut.
Figure 6:
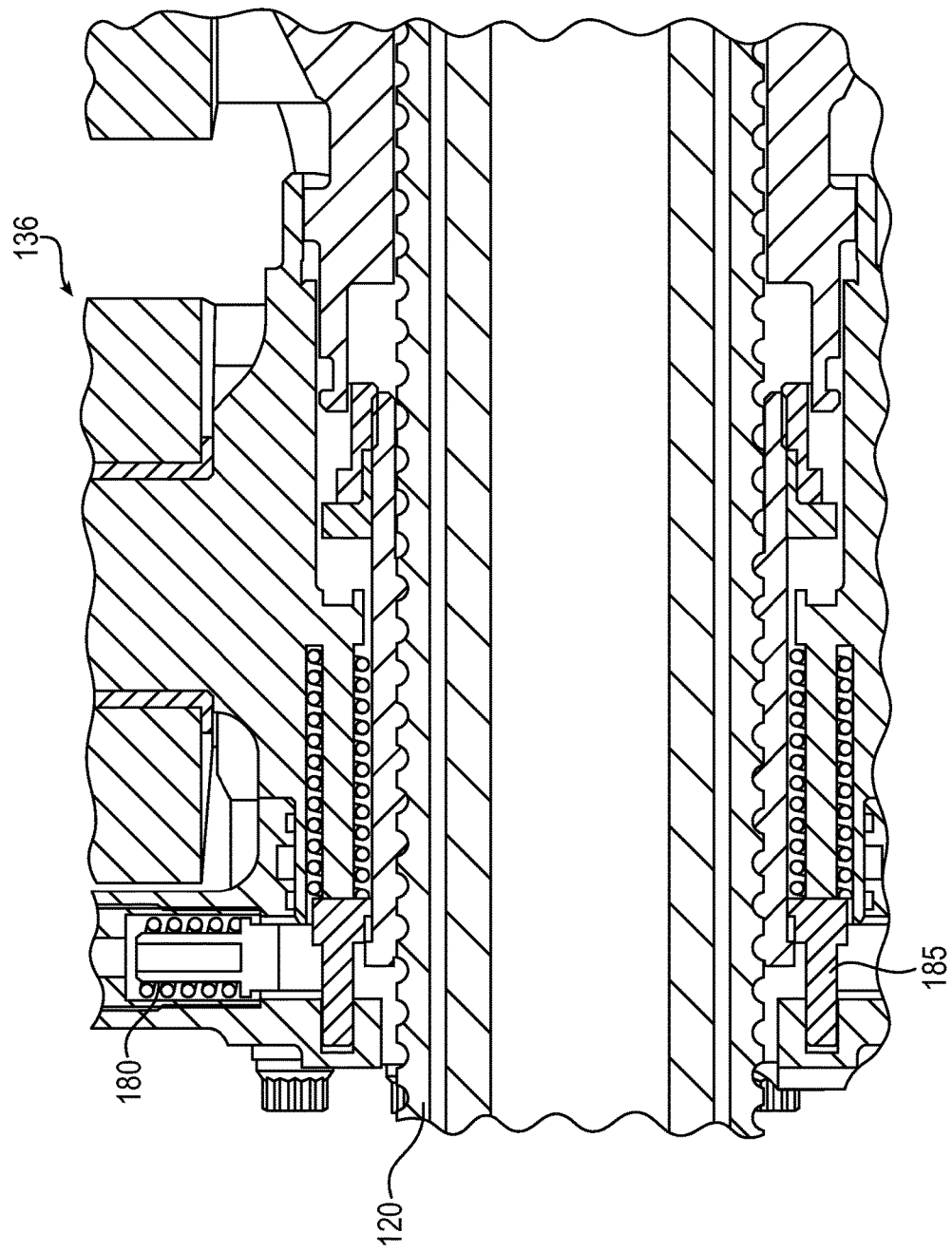
FIG. 6 is another cross-sectional view depicting the upper attachment assembly of the stabilizer actuator with LVDTs driven by a secondary ball nut.
Figure 7:
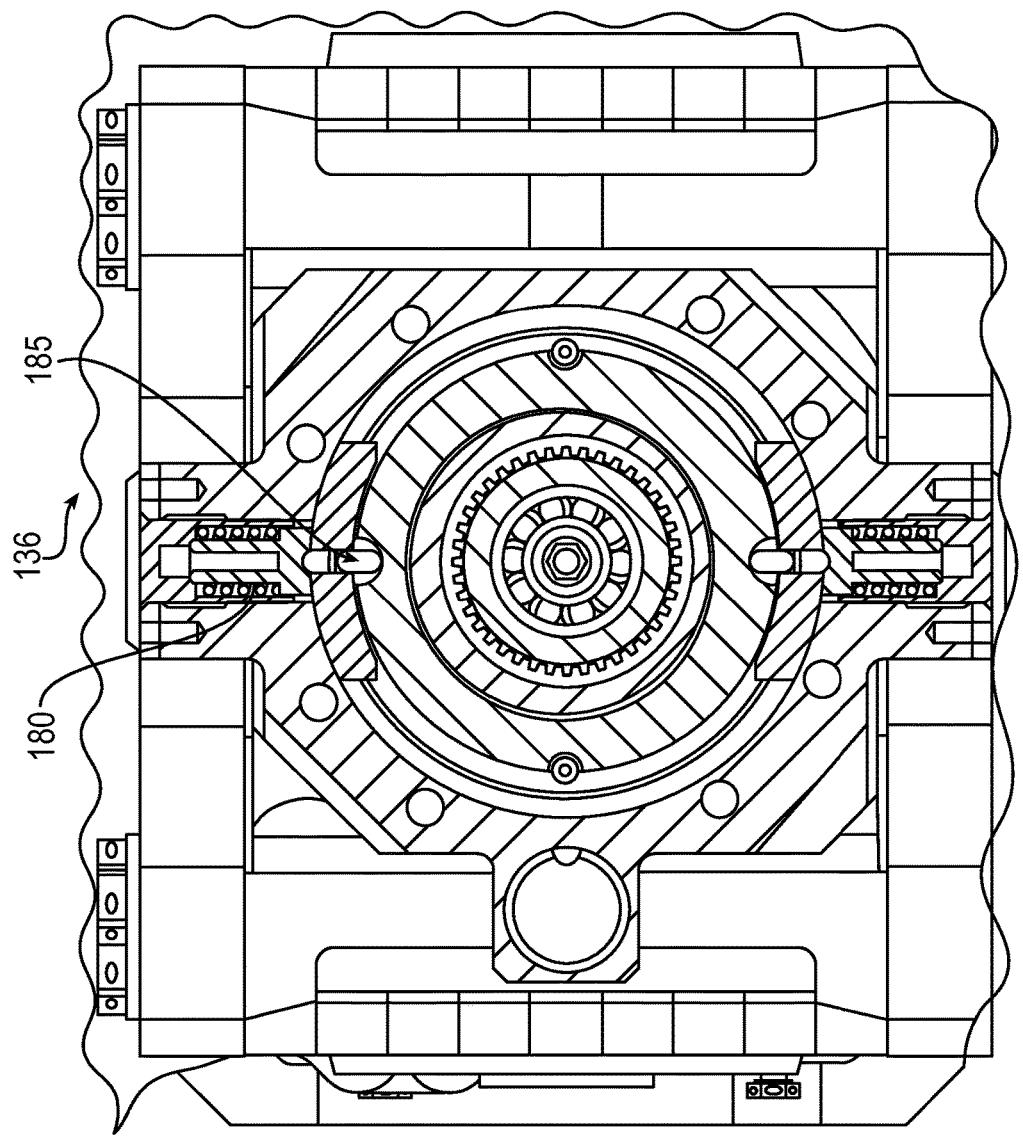
FIG. 7 is a transverse cross-sectional view depicting the upper attachment assembly of the stabilizer actuator with LVDTs driven by a secondary ball nut.
Figure 8:
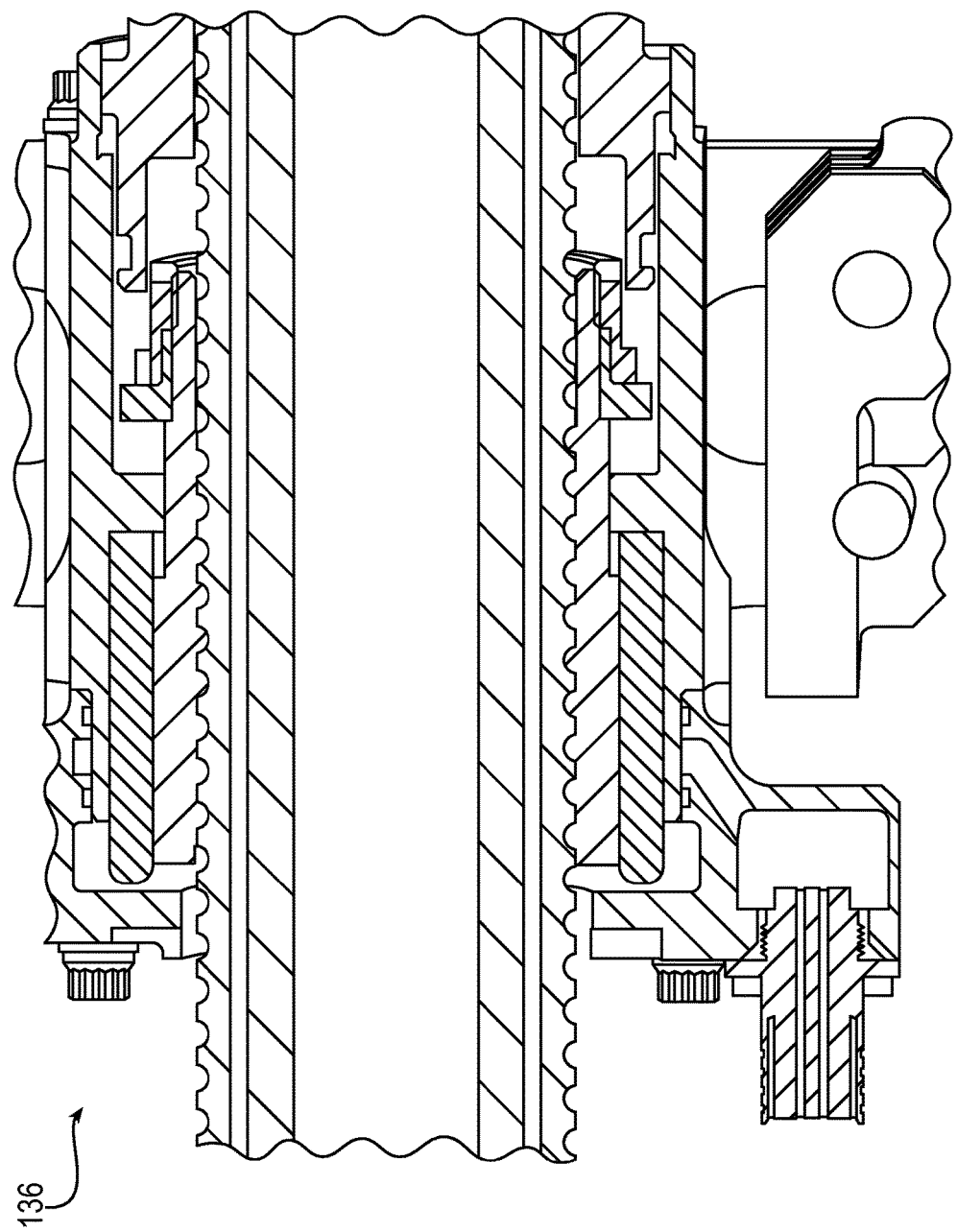
FIG. 8 is another cross-sectional view depicting the upper attachment assembly of the stabilizer actuator with LVDTs driven by a secondary ball nut.
Figure 9:
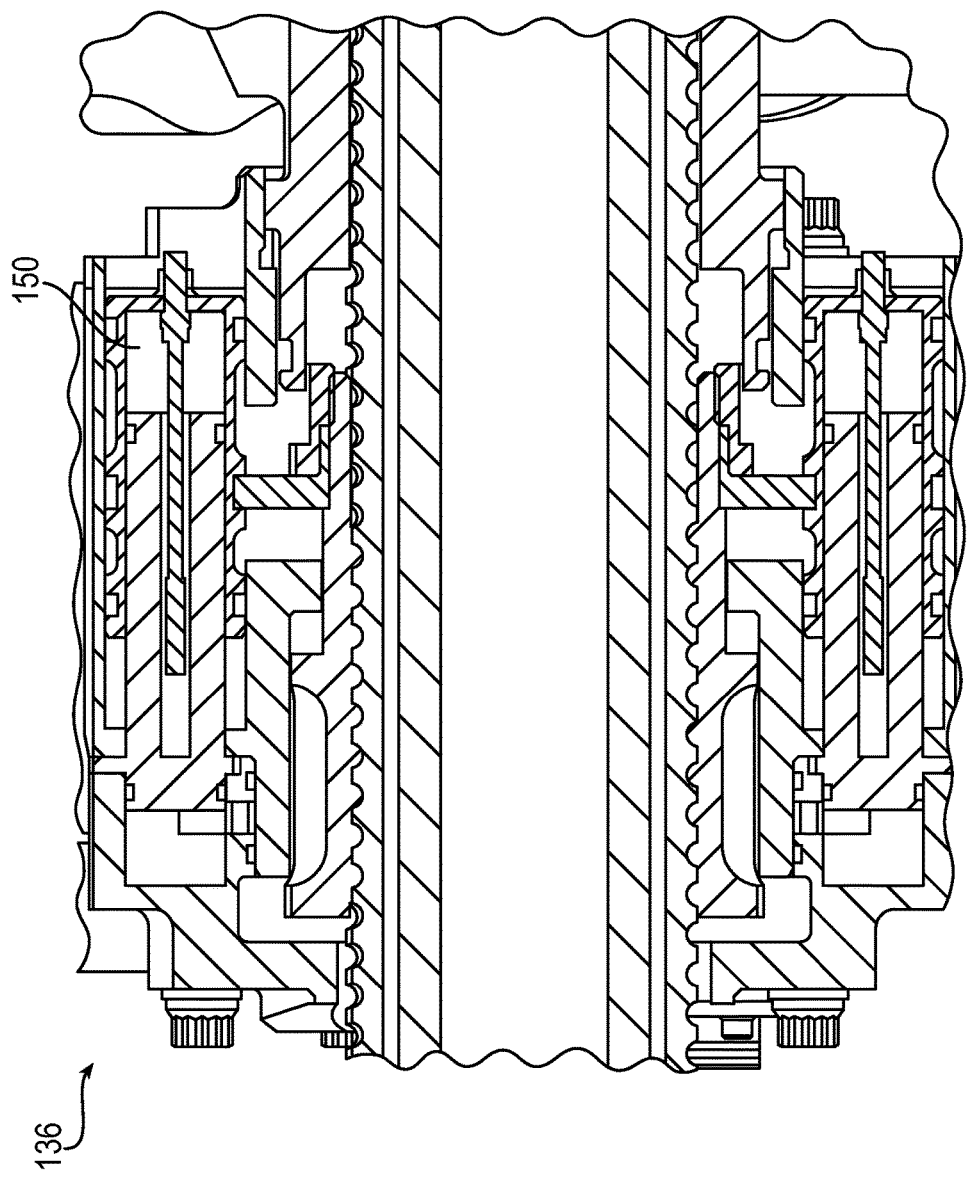
FIG. 9 is another cross-sectional view depicting the upper attachment assembly of the stabilizer actuator with LVDTs driven by a secondary ball nut.
Figure 10:
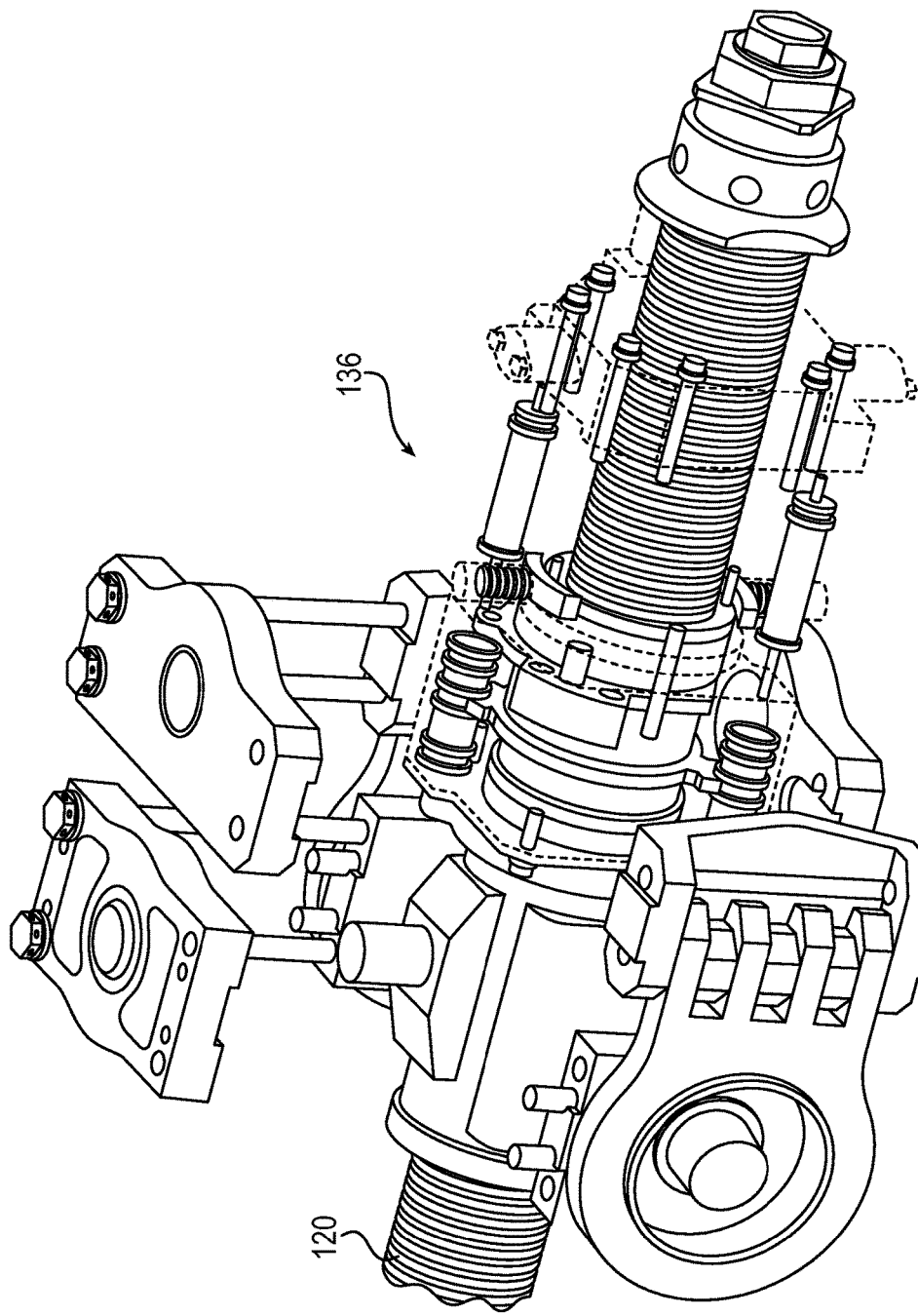
FIG. 10 is an exploded view depicting the secondary nut with LVDTs.
Figure 11:
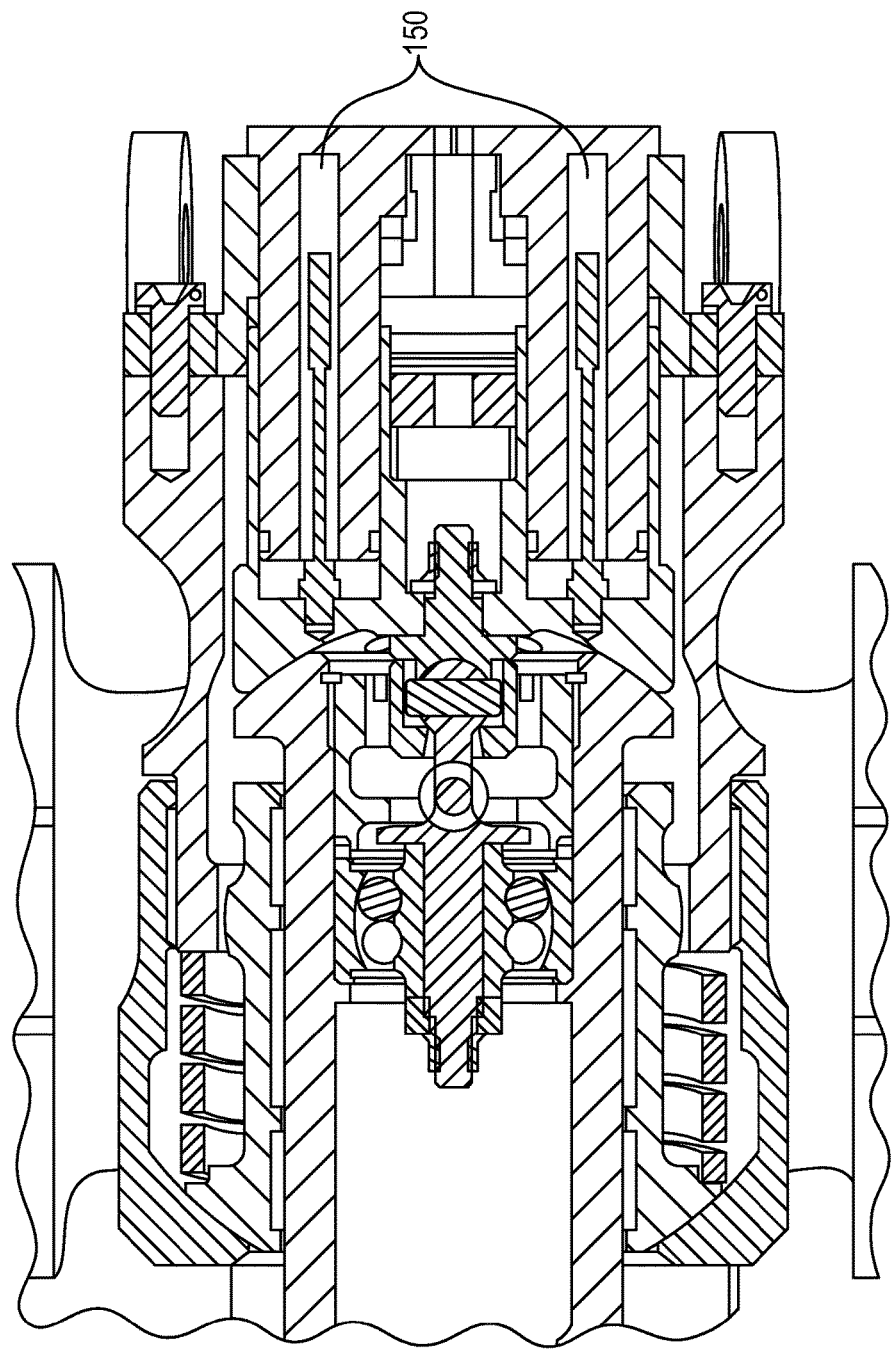
FIG. 11 is a cross-sectional view depicting the lower attachment assembly of the stabilizer actuator with LVDTs and tierod.
Figure 12:
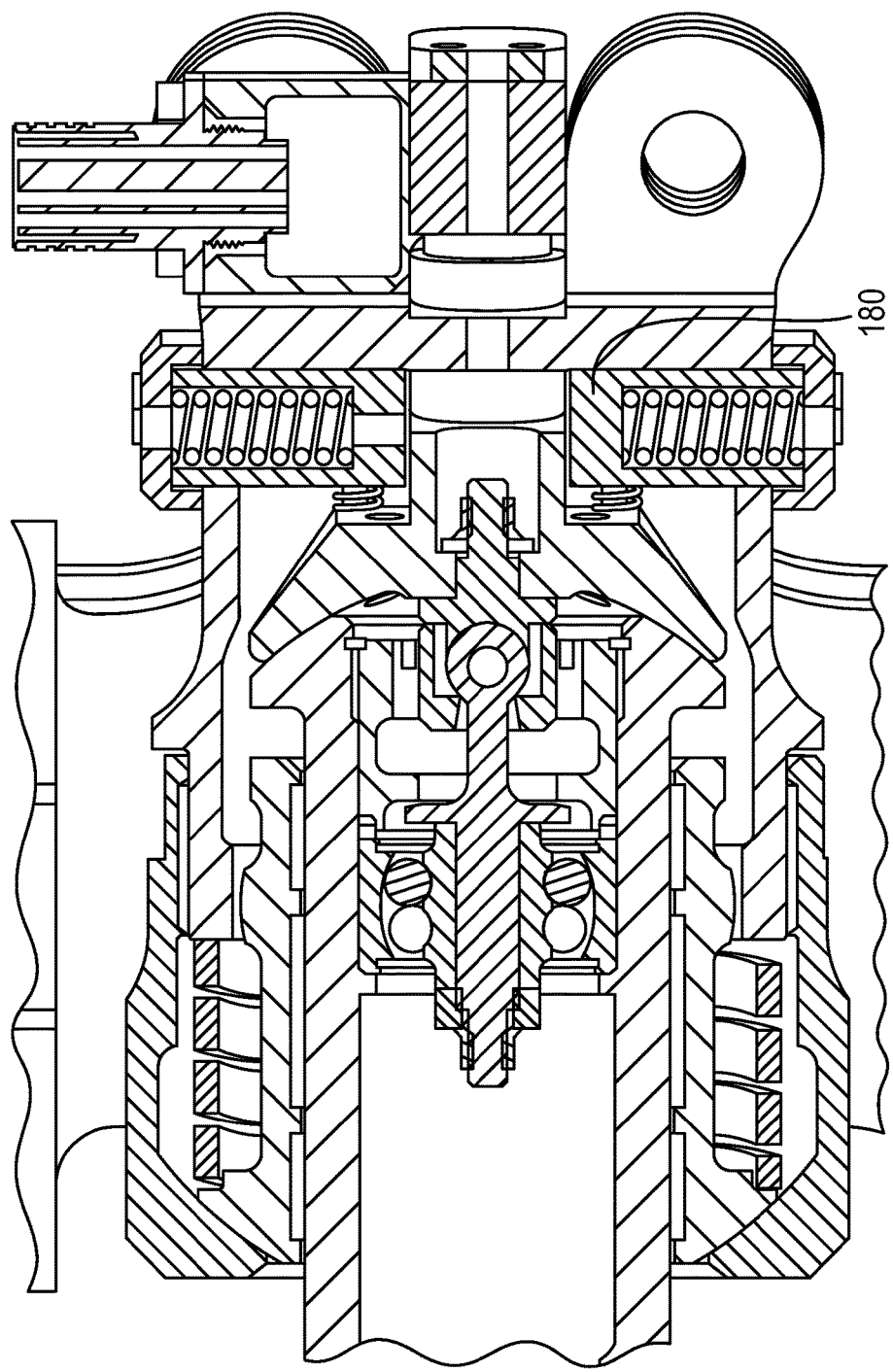
FIG. 12 is another cross-sectional view depicting the lower attachment assembly of the stabilizer actuator with locking keys and tierod.
Figure 13:
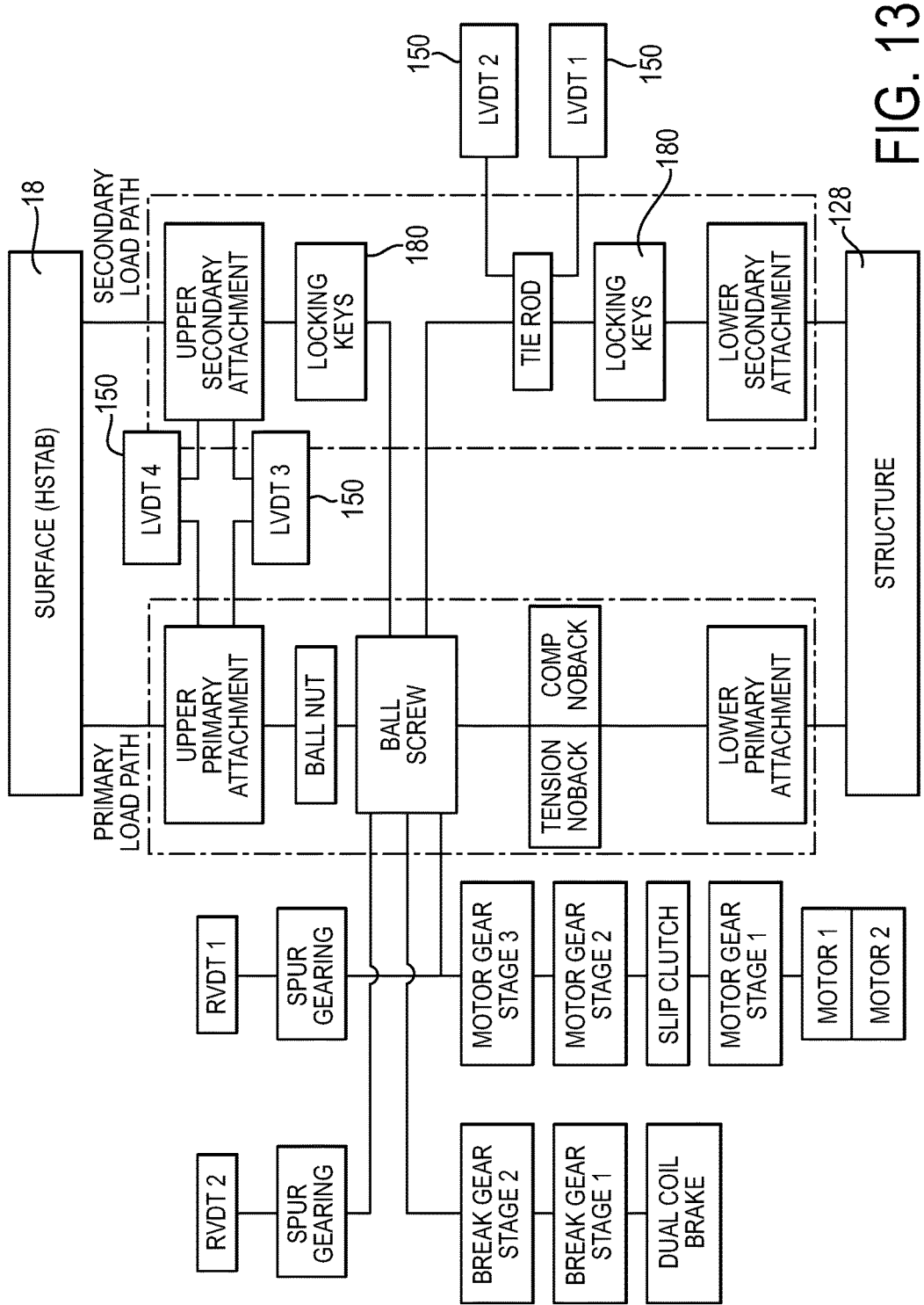
FIG. 13 is a schematic depicting the mechanical interrelationships of the actuation system.

The LVDT's 150 on the right in FIG. 3 and also depicted in FIGS. 5, 9, 10 and 13 would detect failures of any structural member of a moving group of parts on the right, or the upper primary attachment system, such as primary nut gimbal housing 142, primary ball nut assembly 116, trunnion 166. The load is transferred to a secondary ball nut assembly 136 on the ball screw 120 that is independently attached to the aircraft structure with controlled clearance.

In both cases, the failure would result in a relative motion between the primary to the secondary path and will be detected by the LVDT's. The displacement may be any appropriate value but may account for structural deflections and an additional amount needed to release spring locks 180 to hold the stabilizer. The locks may be loaded with approximately 50 pounds of force and may be retained by lock key retainers 185 loaded with approximately 10 pounds of force. During normal operation, this results in very low friction because the secondary load path is not engaged.

Two stationary dowel pins between the secondary nut housing and the secondary nut allows for axial displacement of the secondary nut and, for example, is sufficient to withstand approximately 30 Klbs-in torque. In one embodiment, the secondary nut may, for example be a one-piece construction of 4340 steel heat treated to Rc 50, which would withstand, for example approximately 60 Klbs axial load. In one embodiment, all components of the secondary nut housing may be made of corrosion resistant steel for hard stop endurance and structural load support in case of failure of the primary load path.

After a structural failure, the HSTA may be left with a backlash equal to the secondary load path clearance. This is not an issue in an aircraft with air load in one direction (for example tension loads) only or when the clearance is small enough to preclude further suppression. It can be an issue in some cases, in which case further measures to suppress flutter may be used.

Figure 14:
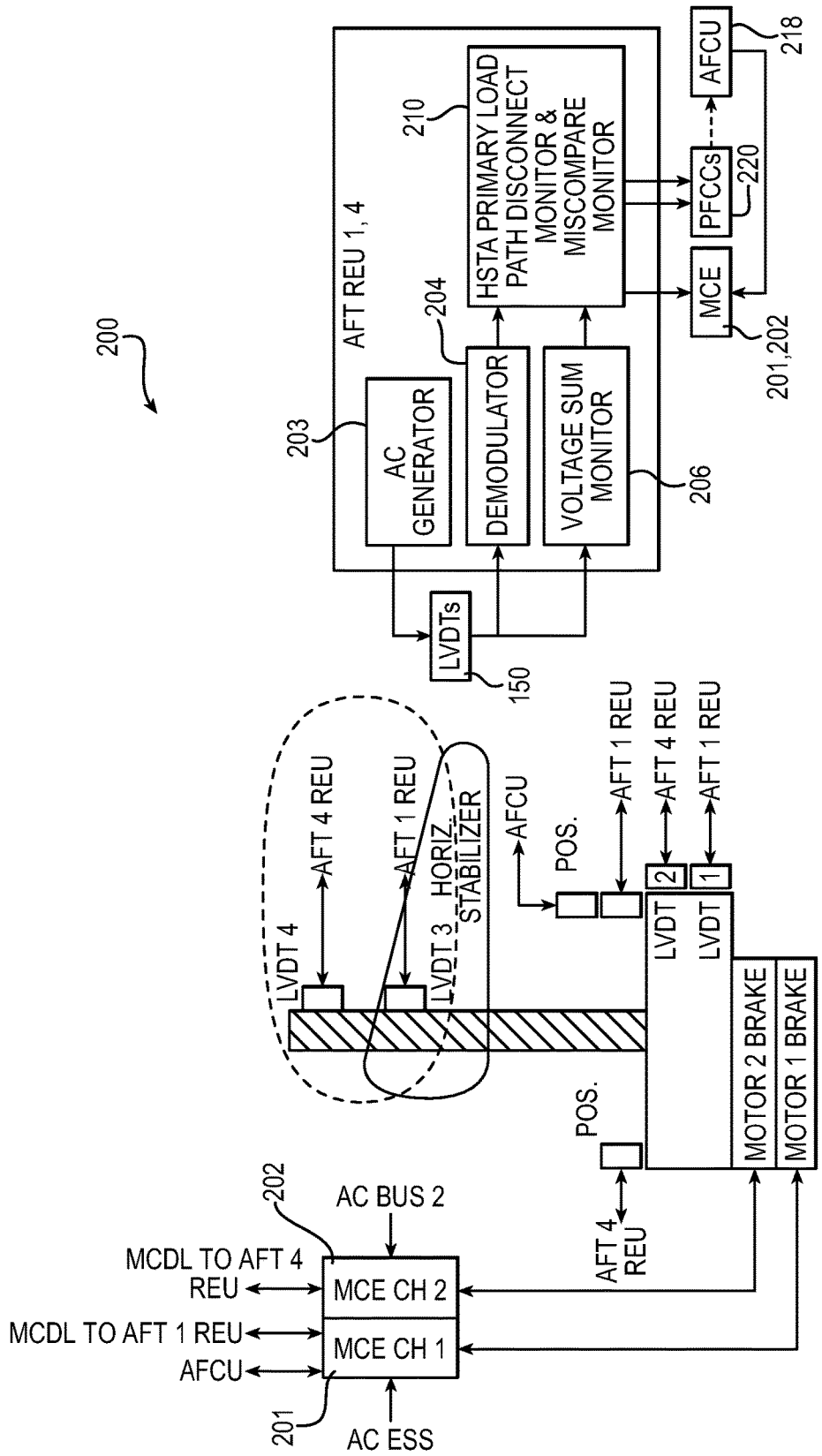
FIG. 14 is an overview schematic of a flight control system including the stabilizer actuator and electrical control systems.
Figure 15:
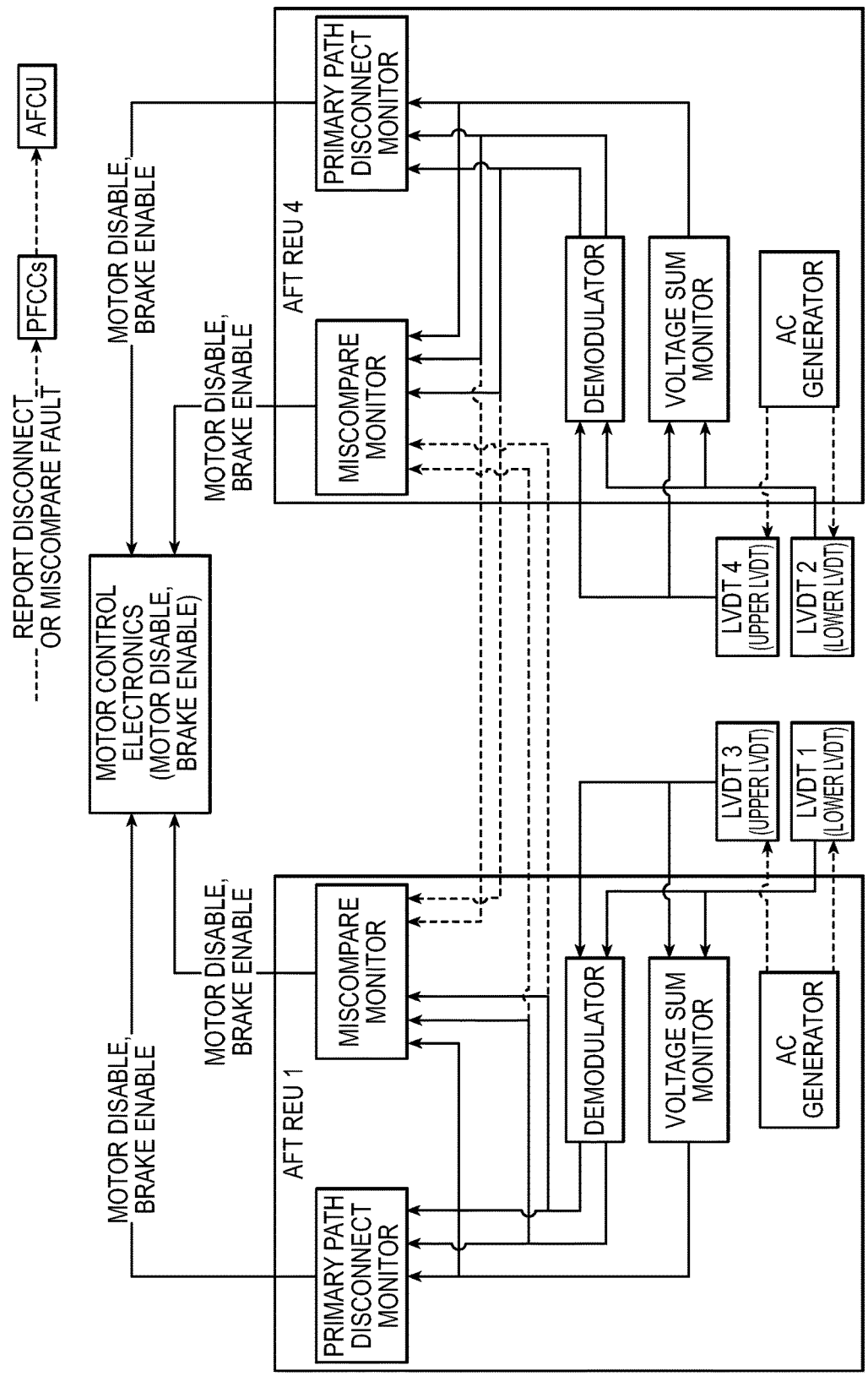
FIG. 15 is a schematic of the control architecture for a flight control system.

Looking to FIGS. 14 and 15, shown is an example flight control system 200 for implementing features of the invention. Motor control electronics 201, 202 send commands to the motor(s) and receive commands from the automatic flight control unit 218. The LVDTs 150 may receive power from an NC generator 203 and send signals to, for example, a demodulator 204 and/or a voltage sum monitor 206. The demodulator and voltage sum monitor may both provide an input to the primary load path disconnect monitor 210.

The disconnect monitor 210 may be programmed with logic (or be a discrete component device designed) to determine that the primary load path is in a failure state. For example, if a relative displacement between the primary load path and the secondary load path is within a predetermined range of values, the disconnect monitor can annunciate the failure. Such annunciation may include, for example, locking the actuator via a dedicated brake or by the inherent ability of the motor driving the actuator. Further, the annunciation may include an audible, visual, or other alert to the pilot, to a flight log, or to any other interested party or system component.

The voltage sum monitor 206 may be used to validate LVDT 150 input data. For example, in a case with two or more LVDTs monitoring the same location, the voltage sum monitor can help determine if there is a faulty LVDT. In one embodiment, any LVDT that has been assessed to be failed, the signal of that LVDT can be excluded from the disconnect monitor. In one embodiment, if two LVDTs at the same location are declared faulty, the actuator can be locked as a safety precaution. An LVDT may be assessed as failed when the displacement is indicated to be greater than the predetermined range of values that indicate a failure of the primary load path. Alternatively, an LVDT may be assessed as failed when the displacement is indicated to be much greater than the predetermined range of values that indicate a failure of the primary load path.

Further, if the disconnect monitor registers a primary load path failure prior to automatic flight control unit 218 mode engagement, the primary flight control computer(s) 220 may notify the automatic flight control unit such that the actuator 100 remains locked in the event that the automatic flight control unit 218 takes control of the aircraft.

Because prior-art systems used mechanical means for detecting primary load path failure and transferring load to a secondary load path, prior art systems are not capable of detecting partial structural failure leading to significant deflection prior to their outright failure. The LVDT detection scheme can provide earlier and safer fault annunciation.

The above described solution solves these and other problems and allows for the incorporation of a more simple locking mechanism (for example, spring-loaded locking keys). For example, the load required to trigger the locking mechanism has been reduced from approximately 4000 pounds in a prior art application to about 50 pounds. Further, the described configuration allows for the normal brake mechanism to be engaged via the electronic monitoring to hold against the external load for the remainder of the flight, rather than using a complicated and heavy latching spline mechanism used in the prior-art.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An actuator system comprising:
   a rotatable ball screw arranged between an actuated surface and a reference structure;
   a primary load path for tightly coupling the actuated surface to the reference structure, the primary load path having a first primary attachment structure connected between the ball screw and the actuated surface and a second primary attachment structure connected between the ball screw and the reference structure, the first primary attachment structure having a primary ball nut that is axially translatable along the ball screw;
   a secondary load path for coupling the actuated surface to the reference structure with backlash, wherein the secondary load path is unloaded during an operative state of the primary load path and loaded during a failure state of the primary load path, the secondary load path having a first secondary attachment structure connected between the ball screw and the actuated surface and a second secondary attachment structure connected between the ball screw and the reference structure, the first secondary attachment structure having a secondary ball nut that is axially translatable along the ball screw; and
   a first sensor configured to sense the failure state of the first primary attachment structure of the primary load path, the first sensor having a linear variable differential transducer that is coupled between the primary ball nut and the secondary ball nut and configured to provide an output that is indicative of a relative displacement between the primary ball nut and the secondary ball nut for comparison to a predetermined value for identifying the failure state of the first primary attachment structure.

2. The actuator system of claim 1, wherein the second primary attachment structure includes at least one of a main housing, gimbal, primary attachment pins, or the ballscrew.

3. The actuator system of claim 1, wherein the first primary attachment structure includes at least one of a primary nut gimbal housing, primary ball nut assembly, or trunnion.

4. The actuator system of claim 1, wherein the secondary load path includes at least one locking mechanism, that is actuatable when the primary load path is in the failure state.

5. The actuator system of claim 4, wherein the at least one locking mechanism includes a set of spring-loaded anti-backlash keys that are releasable in response to relative displacement between the primary ball nut and the secondary ball nut.

6. The actuator system of claim 1, wherein the actuator system is located in an aircraft and the sensor is configured to sense the failure state of the primary load path when the aircraft is in flight.

7. The actuator system of claim 1, wherein the second secondary attachment structure includes a tie rod and the actuator system includes a second LVDT sensor coupled to the tie rod that is configured to provide an output indicative of a relative displacement between the tie rod and the second primary attachment structure and compare the output to a predetermined value for identifying a failure state of the second primary attachment structure of the primary load path.

8. The actuator system of claim 1 further comprising a set of anti-backlash keys arranged between the ball screw and the first secondary attachment structure and a second set of anti-backlash keys arranged between the ball screw and the second secondary attachment structure, the set of anti-backlash keys being releasable in response to the relative displacement between the primary ball nut and the secondary ball nut.

9. The actuator system of claim 1 further comprising two first sensors that are coupled between the primary ball nut and the secondary ball nut.

10. The actuator system of claim 1, wherein the first primary attachment structure and the first secondary attachment structure are independently attached to the actuated surface.

11. The actuator system of claim 1, wherein the second primary attachment structure and the second secondary attachment structure are independently attached to the reference structure.

12. An actuator system comprising:
a rotatable ball screw arranged between an actuated surface and a reference structure;
a primary load path for tightly coupling the actuated surface to the reference structure, the primary load path having a first primary attachment structure connected between the ball screw and the actuated surface and a second primary attachment structure connected between the ball screw and the reference structure, the first primary attachment structure having a primary ball nut that is axially translatable along the ball screw;
a secondary load path for coupling the actuated surface to the reference structure with backlash, wherein the secondary load path is unloaded during an operative state of the primary load path and loaded during a failure state of the primary load path, the secondary load path having a first secondary attachment structure connected between the ball screw and the actuated surface and a second secondary attachment structure connected between the ball screw and the reference structure, the first secondary attachment structure having a secondary ball nut that is axially translatable along the screw, the second secondary attachment structure having a tie rod;
a first sensor coupled between the primary ball nut and the secondary ball nut that is configured to provide an output indicative of a relative displacement between the primary ball nut and the secondary ball nut and compare the output to a predetermined value for identifying a failure state of the upper primary attachment structure of the primary load path; and
a second sensor coupled to the tie rod that is configured to provide an output indicative of a relative displacement between the tie rod and the second primary attachment structure and compare the output to a predetermined value for identifying a failure state of the second primary attachment structure of the primary load path.

13. The actuator system of claim 12, wherein each of the first sensor and the second sensor includes a linear variable differential transducer.

14. An actuator system comprising:
a rotatable ball screw arranged between an actuated surface and a reference structure;
a primary load path for tightly coupling the actuated surface to the reference structure, the primary load path having an upper primary attachment structure connected between the ball screw and the actuated surface and a lower primary attachment structure connected between the ball screw and the reference structure; and
a secondary load path for coupling the actuated surface to the reference structure with backlash during a failure state of the primary load path, the secondary load path having an upper secondary attachment structure connected between the ball screw and the actuated surface independently from the upper primary attachment structure, the secondary load path having a lower secondary attachment structure connected between the ball screw and the reference structure independently from the lower primary attachment structure.

15. The actuator system of claim 14, wherein the actuator system includes four connection brackets, the upper primary attachment structure and the upper secondary attachment structure being connected to the actuated surface via a first and second bracket, the lower primary attachment structure and the lower secondary attachment structure being connected to the reference structure via a third and fourth bracket.

* * * * *